US 8,150,214 B2

(12) United States Patent
Farouki et al.

(10) Patent No.: US 8,150,214 B2
(45) Date of Patent: Apr. 3, 2012

(54) INFERRED DISCOVERY AND CONSTRUCTION OF MULTI-RESOLUTION IMAGES

(75) Inventors: Karim Taji Farouki, Seattle, WA (US); Blaise Hilary Aguera-Arcas, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1162 days.

(21) Appl. No.: 11/945,345

(22) Filed: Nov. 27, 2007

(65) Prior Publication Data

US 2009/0136156 A1 May 28, 2009

(51) Int. Cl.
*G06K 9/32* (2006.01)

(52) U.S. Cl. ......... 382/299; 382/294; 382/298; 382/301

(58) Field of Classification Search .................. 382/299, 382/294, 298, 301
See application file for complete search history.

(56) References Cited

U.S. PATENT DOCUMENTS

| | | | |
|---|---|---|---|
| 5,991,816 A | 11/1999 | Percival et al. | |
| 6,396,503 B1 | 5/2002 | Goss et al. | |
| 6,396,507 B1* | 5/2002 | Kaizuka et al. | 345/661 |
| 6,810,425 B2 | 10/2004 | Yamamoto | |
| 6,839,067 B2* | 1/2005 | Liu et al. | 345/647 |
| 6,847,467 B2 | 1/2005 | Obrador | |
| 6,904,176 B1* | 6/2005 | Chui et al. | 382/240 |
| 6,967,651 B2* | 11/2005 | Endoh et al. | 345/428 |
| 6,993,594 B2 | 1/2006 | Schneider | |
| 7,116,833 B2* | 10/2006 | Brower et al. | 382/240 |
| 7,155,065 B1 | 12/2006 | Malvar | |
| 7,173,620 B2 | 2/2007 | Endoh et al. | |
| 7,343,052 B2* | 3/2008 | Roth et al. | 382/299 |
| 7,778,493 B2* | 8/2010 | Ho et al. | 382/299 |
| 7,877,445 B2* | 1/2011 | Komine et al. | 709/205 |
| 7,992,104 B2* | 8/2011 | Weir et al. | 715/838 |
| 8,031,975 B2* | 10/2011 | Roble et al. | 382/299 |
| 2002/0021758 A1* | 2/2002 | Chui | 375/240.19 |
| 2002/0025084 A1* | 2/2002 | Yang et al. | 382/299 |
| 2002/0180734 A1* | 12/2002 | Endoh et al. | 345/428 |
| 2003/0108252 A1* | 6/2003 | Carrig | 382/299 |
| 2003/0138161 A1* | 7/2003 | Rising, III | 382/265 |
| 2004/0017386 A1* | 1/2004 | Liu et al. | 345/647 |
| 2004/0028293 A1* | 2/2004 | Allen et al. | 382/300 |
| 2004/0156561 A1* | 8/2004 | Yu-Chuan et al. | 382/298 |
| 2004/0243635 A1* | 12/2004 | Christophersen et al. | 707/104.1 |

(Continued)

OTHER PUBLICATIONS

Fast Multiresolution Image Querying, Jacobs et al., ACM, 0-89791-701-4, 1995, pp. 277-286.*

Jacobs et al., "Fast Multiresolution Image Querying" , 1995, ACM , pp. 277-286.

(Continued)

*Primary Examiner* — Jayesh A Patel
(74) *Attorney, Agent, or Firm* — Capitol City TechLaw; Richard C. Irving (57) ABSTRACT

A method and a processing device may be provided for discovering and constructing multi-resolution images. Content, including an image, may be obtained from a specified address via a network and rendered to a display monitor of the processing device. The processing device may attempt to discover a second image, corresponding to the image included in the obtained content, but with a different resolution than a resolution of the image included in the obtained content. If the second image is discovered, the second image and the image included in the obtained content may be linked to create a multi-resolution image. If the image included in the content rendered to the display monitor is enlarged beyond a threshold, the rendered image may become pixelated. A high resolution image corresponding to and linked to the rendered image may be blended into the enlarged rendered image to eliminate pixelation.

18 Claims, 6 Drawing Sheets

U.S. PATENT DOCUMENTS

| | | |
|---|---|---|
| 2005/0219620 A1 | 10/2005 | Ohshita |
| 2006/0044599 A1 | 3/2006 | Lipowitz et al. |
| 2007/0038725 A1* | 2/2007 | Kwak .................... 709/219 |
| 2007/0252834 A1* | 11/2007 | Fay ........................ 345/428 |
| 2007/0292048 A1* | 12/2007 | Choe et al. ............. 382/286 |

OTHER PUBLICATIONS

Smith, "Introducing Zoomify Image", Cornell University Library, 2003-2007, pp. 7.

* cited by examiner

INFERRED DISCOVERY AND CONSTRUCTION OF MULTI-RESOLUTION IMAGES

BACKGROUND

Computer monitor resolution has increased along with computer network bandwidth. However, many images stored on processing devices connected to a computer network, such as, for example, the Internet or other networks, are not encoded in a multi-resolution format. Consequently, a user may execute a browser on a processing device to view an image not encoded in the multi-resolution format. As the user starts "zooming-in" on rendered content, including the image, the image may be rendered larger than originally intended. As a result, the image may be rendered with poor detail and may become pixelated.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In embodiments consistent with the subject matter of this disclosure, a method and a processing device may be provided. The processing device may execute a browser application for obtaining content from a specified address via a network and rendering the content to a display monitor of the processing device. The obtained content may include an image. The processing device may attempt to discover a second image, corresponding to the image included in the obtained content, but having a resolution different from a resolution of the image included in the obtained content. If the second image is discovered, then the image and the second image may be linked to create a multi-resolution image.

A user may enter a command to enlarge an image included in the rendered content. As the image is enlarged, the enlarged image may become pixelated. The processing device may detect that a size of the enlarged image is beyond a threshold and may attempt to discover a corresponding image having a higher resolution than the enlarged image. If the corresponding image is discovered, the processing device may blend aspects of the corresponding image into the enlarged image to eliminate pixelation of the enlarged image.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it is to be understood that this is done for illustration purposes only. A person skilled in the relevant art will recognize that other components and configurations may be used without parting from the spirit and scope of the subject matter of this disclosure.

Overview

Embodiments consistent with the subject matter of this disclosure may provide a processing device and a method in which content, including an image, may be obtained via a computer network and rendered on a display monitor of the processing device. In some embodiments, the processing device may execute a browser to obtain and render the content on the display monitor. An attempt may be made to discover a corresponding image having a different resolution than a rendered image. If the corresponding image is discovered, the rendered image and the corresponding image may be linked to create a multi-resolution image.

When the processing device displays the rendered content, the user may enter a command to enlarge or zoom-in on the rendered content. The command may be entered in a number of different ways, including, but not limited to, using a computer pointing device, such as, for example, a computer mouse, to place a cursor over an area to be an enlarged and using a scroll wheel of a computer mouse to indicate an amount by which the area is to be an enlarged. Of course, numerous other methods may be used by the user to enter the command to enlarge the rendered content. As a rendered image is enlarged, the processing device may detect that a size of the enlarged image is beyond a threshold and, as such, the rendered enlarged image may become pixelated. The enlarged image may be a newly-created multi-resolution image. The processing device may discover a corresponding image having a higher resolution than the pixelated rendered image. The processing device may then blend aspects of the corresponding higher resolution image into the enlarged rendered image to eliminate pixelation of the rendered enlarged image.

The method may be recursive. For example, as the rendered image is further enlarged, the processing device may further discover an other corresponding image having an even higher resolution, such that aspects of the other corresponding image may be blended into the rendered enlarged image to eliminate the pixelation of the rendered enlarged image.

Exemplary Operating Environment

Figure 1:
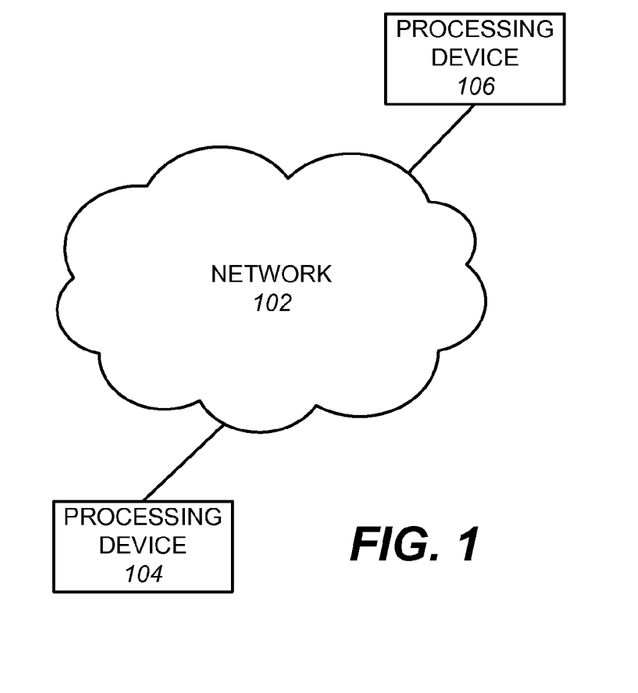
FIG. 1 illustrates an exemplary operating environment for embodiments consistent with the subject matter of this disclosure.

FIG. 1 illustrates an exemplary operating environment 100 consistent with the subject matter of this disclosure. Exemplary operating environment 100 may include a network 102 and processing devices 104, 106.

Network 102 may be a single network or a combination of networks, such as, for example, the Internet or other networks. Network 102 may include a wireless network, a wired network, a packet-switching network, a public switched telecommunications network, a fiber-optic network, other types of networks, or any combination of the above.

Processing device 104 may be a user's processing device, such as, for example, a desktop personal computer (PC), a laptop PC, a handheld processing device, or other processing device.

Processing device 106 may include a server. In some embodiments, an operating environment may include multiple processing devices 106 or servers. The servers may be configured to work together as a server farm.

Exemplary Processing Device

Figure 2:
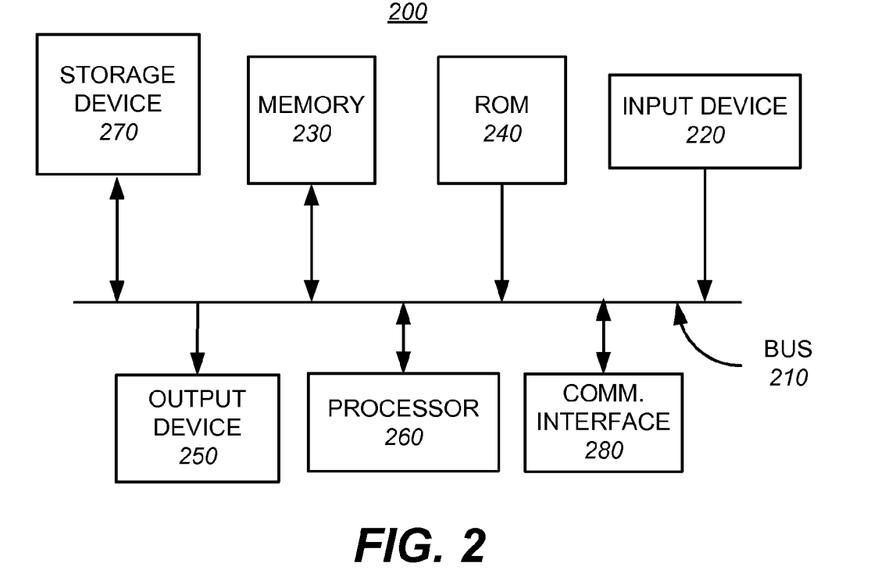
FIG. 2 is a functional block diagram of an exemplary processing device, which may implement processing devices shown in FIG. 1.

FIG. 2 is a functional block diagram of an exemplary processing device 200, which may be used in embodiments consistent with the subject matter of this disclosure to implement processing device 104 and/or processing device 106. Processing device 200 may include a bus 210, an input device 220, a memory 230, a read only memory (ROM) 240, an output device 250, a processor 260, a storage device 270, and a communication interface 280. Bus 210 may permit communication among components of processing device 200.

Processor 260 may include at least one conventional processor or microprocessor that interprets and executes instructions. Memory 230 may be a random access memory (RAM) or another type of dynamic storage device that stores information and instructions for execution by processor 260. Memory 230 may also store temporary variables or other intermediate information used during execution of instructions by processor 260. ROM 240 may include a conventional ROM device or another type of static storage device that stores static information and instructions for processor 260. Storage device 270 may include a compact disc (CD), digital video disc (DVD), a magnetic medium, or other type of storage device for storing data and/or instructions for processor 260.

Input device 220 may include a keyboard, a joystick, a pointing device or other input device. Output device 250 may include one or more conventional mechanisms that output information, including one or more display monitors, or other output devices. Communication interface 280 may include a transceiver for communicating via one or more networks via a wired, wireless, fiber optic, or other connection.

Processing device 200 may perform such functions in response to processor 260 executing sequences of instructions contained in a machine-readable storage medium, such as, for example, memory 230, ROM 240, storage device 270 or other machine-readable storage media. Such instructions may be read into memory 230 from another machine-readable storage medium or from a separate device via communication interface 280.

Exemplary Processing

Figure 3:
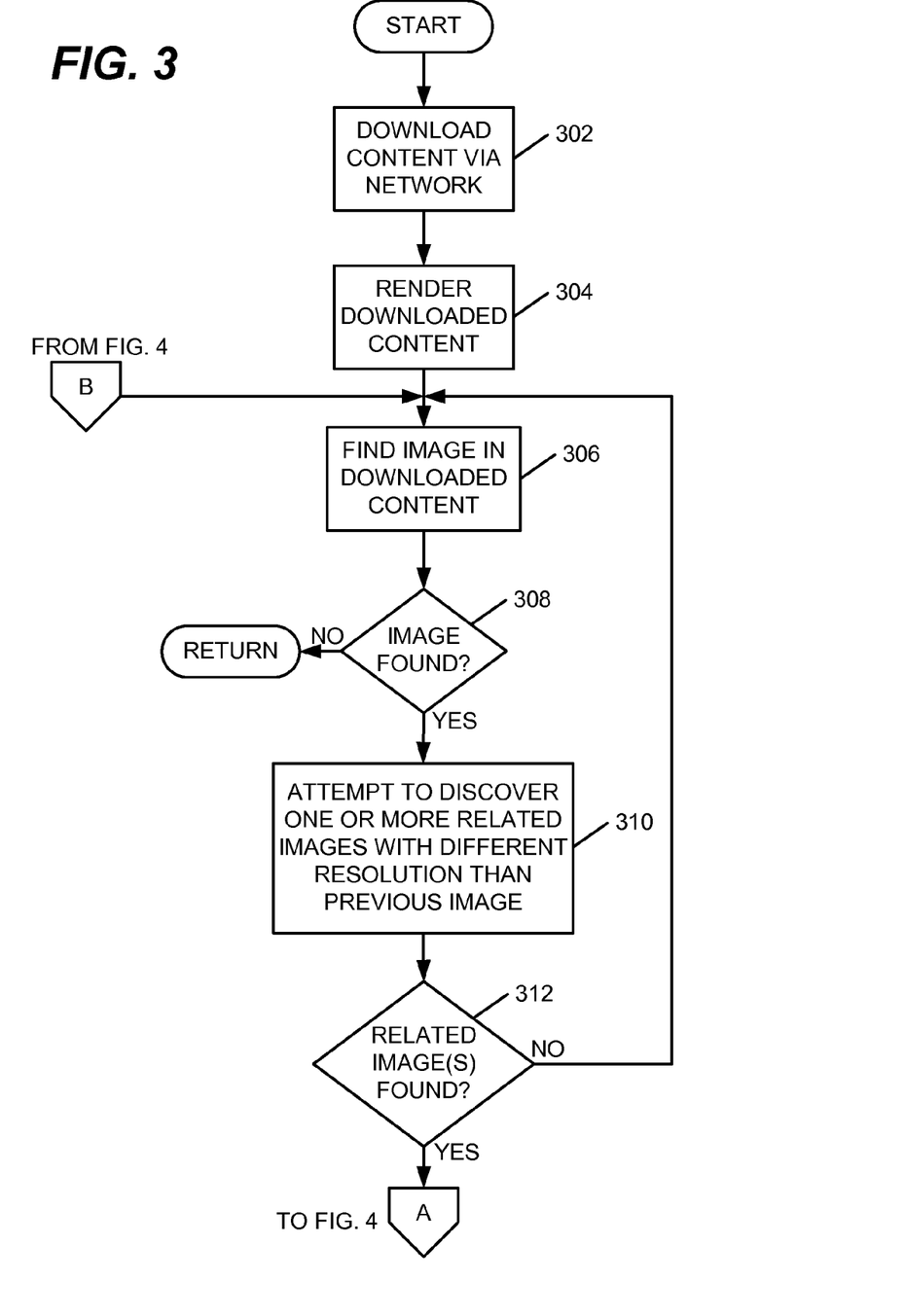
FIGS. 3 and 4 are flowcharts which illustrate an exemplary process for discovering and creating a multi-resolution image.

FIG. 3 is a flowchart illustrating exemplary processing, which may be performed in embodiments of processing device 104 consistent with the subject matter of this disclosure. A processing device, such as processing device 104 may execute a browser to obtain and display content via a network. The process may begin with processing device 104 executing the browser, or another application, to download content of a specified address, which may be an address referring to processing device 106, via network 102 (act 302). Processing device 104 may then render the downloaded content to a display monitor (act 304). Processing device 104 may then attempt to find an image within the downloaded content (act 306).

Figure 5:
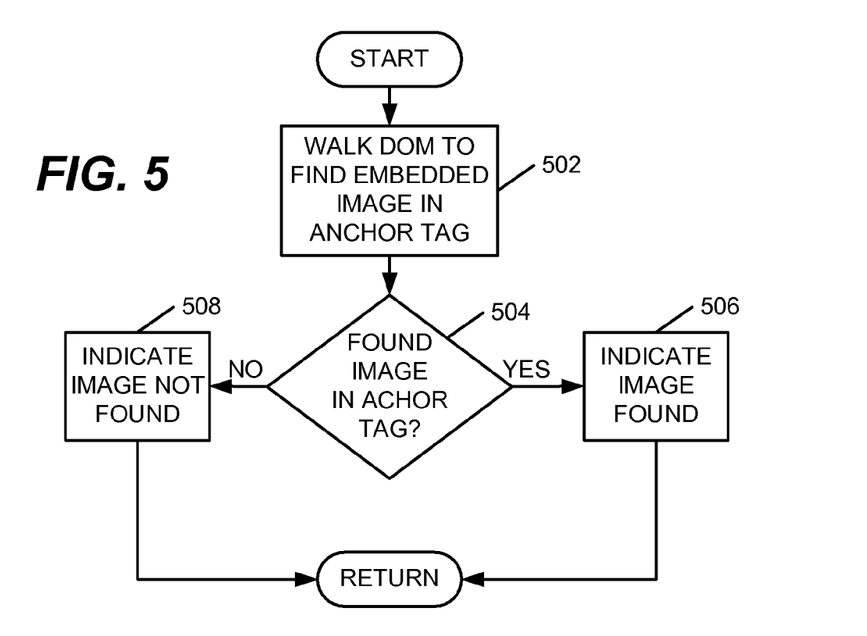
FIG. 5 is a flowchart illustrating an exemplary process for finding an image in downloaded content, which may have a corresponding high-resolution image.

FIG. 5 is a flowchart illustrating exemplary processing 306-1 which may be performed during act 306 in one embodiment consistent with the subject matter of this disclosure. The process may begin with processing device 104 walking through a document object model (DOM) of the downloaded content to find an embedded image within an anchor tag (act 502). A DOM is a well known standard way of representing hypertext markup language (HTML), as well as other standard generalized markup language (SGML) derived documents, as data objects within a tree. An anchor tag is a tag which points to a location within a webpage.

Next, processing device 104 may determine whether an embedded image was found within the anchor tag (act 504). If an embedded image was found, then processing device 104 may provide an indication that an embedded image was found (act 506) by for example, setting a flag. Otherwise, processing device 104 may provide an indication that an embedded image was not found (act 508).

Returning to FIG. 3, processing device 104 may determine whether an embedded image was found, based on the provided indication (act 308). If no embedded image was found, then the process may be completed.

If, during act 308, processing device 104 determines that an image was found, then processing device 104 may attempt to discover one or more related images with different resolution than the found image based on information associated with the found image (act 310).

Figure 6:
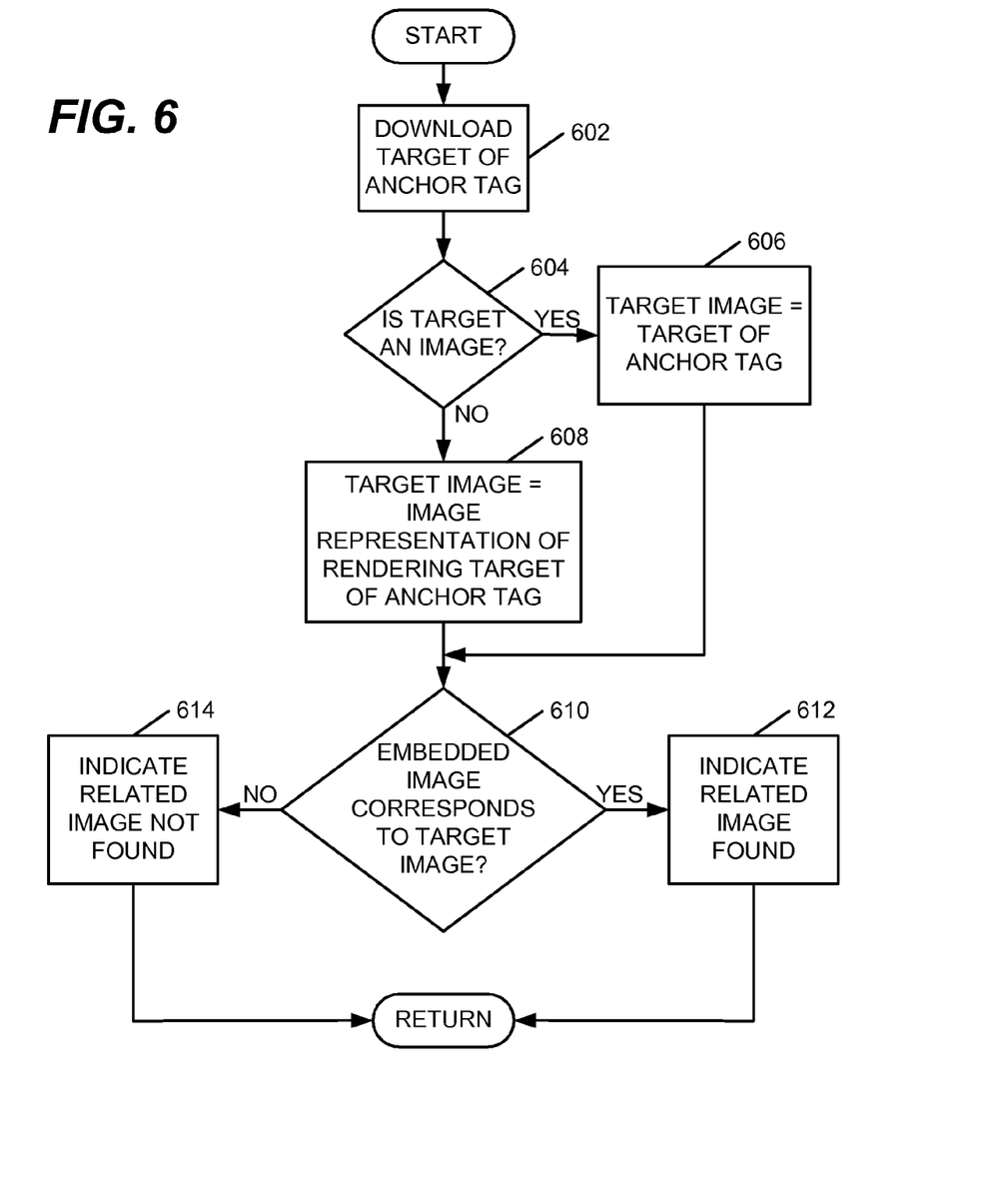
FIG. 6 is a flowchart of an exemplary process for attempting to discover one or more related images having different resolutions.

FIG. 6 is a flowchart illustrating an exemplary process 310-1, which may be performed by processing device 104 during act 310 in the embodiment previously referred to with respect to FIG. 5. The process may begin with processing device 104 using a link, within the anchor tag having the embedded image, to download a target of the anchor tag (act 602). The target of the anchor tag may be downloaded asynchronously.

Next, processing device 104 may determine whether the target of the anchor tag is an image (act 604). If processing device 104 determines that the target of the anchor tag is an image, then processing device 104 may set a target image to be a target of the anchor tag (act 606).

If, during act 604, processing device 104 determines that the target of the anchor tag is not an image, then processing device 104 may set the target image to be an image representation of the rendered target of the anchor tag (act 608). That is, processing device 104 may create an image, such as, for example, a screen capture, of a webpage corresponding to the target of the anchor tag.

Next, processing device 104 may compare the embedded image within the anchor tag to the target image to determine whether the target image and the embedded image correspond to one another, but are of different resolutions (act 610). In some embodiments, the target image may have a higher resolution than the embedded image. An image comparison method used to compare the embedded image and the target image may be any well known image comparison method which is agnostic to differences in resolution of compared images.

If processing device 104 determines that the target image and the embedded image correspond to one another and are of different resolutions, then processing device 104 may indicate that a related the image was found (act 612) by, for example, setting a flag. Otherwise, processing device 104 may indicate that a related image was not found (act 614).

Returning to FIG. 3, processing device 104 may determine whether one or more related images were found based on an indication returned as a result of performing act 310 (act 312). If no related image or images were found, then processing device 104 may again perform act 306 to find a next image, if any, in the downloaded content.

Figure 4:
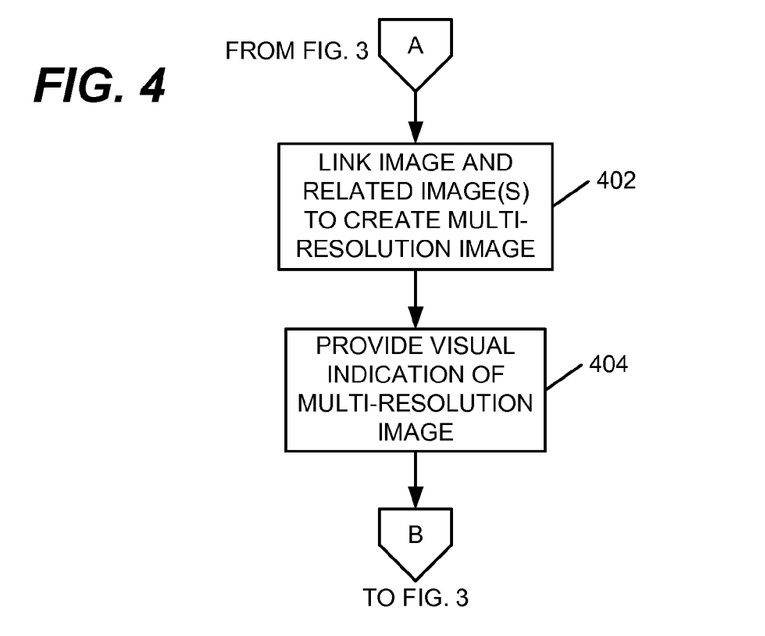

If, during act 312, one or more related images were found, then processing device 104 may link the image and the one or more found related images to create a multi-resolution image (act 402; FIG. 4). Processing device 104 may provide a visual indication, with respect to the rendered image, that the rendered image is a multi-resolution image (act 404). Processing device 104 may then perform act 306 (FIG. 3) to attempt to find another image within the downloaded content.

In another embodiment consistent with the subject matter of this disclosure, when performing act 306 (FIG. 3), instead of walking a DOM to search for an embedded image with an anchor tag, processing device 104 may simply attempt to find an image within the downloaded content. If an image is found, processing device 104 may provide an indication by, for example, setting a flag. If an image is not found, processing device 104 may provide an indication that no image was found.

Figure 7:
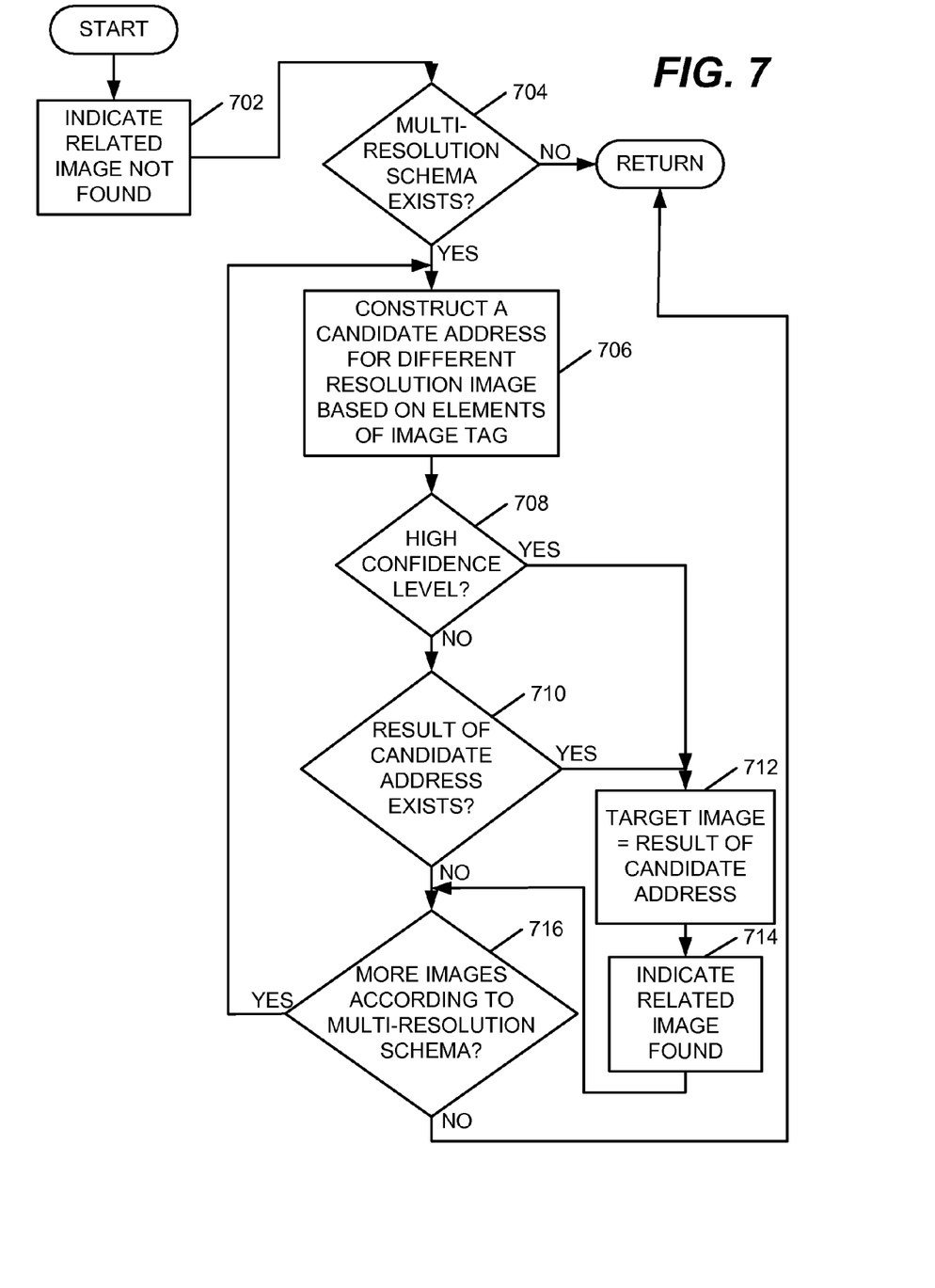
FIG. 7 is a flowchart of a second exemplary process for attempting to discover one or more related images having different resolutions.

FIG. 7 is a flowchart 310-2 illustrating an exemplary process for performing act 310 of FIG. 3 in the embodiment referred to in the immediately preceding paragraph. The process may begin with processing device 104 indicating that an image related to the found image was not found (act 702). Processing device 104 may then determine whether a multi-resolution image schema exists for the specified address corresponding to the rendered downloaded content (act 704). This may be performed by processing device 104 determining whether a corresponding multi-resolution image schema matching the specified address exists in a data store such as, for example, storage device 270, memory 230, ROM 240, or other data store of processing device 104. If the corresponding multi-resolution image schema does not exist, then no related image was found and the process is completed.

If, during act 704, processing device 104 determines that the corresponding multi-resolution scheme exists, then elements of an image tag included within the multi-resolution schema, such as, for example, image path, ID, and a link, as well as other information, may be passed to an image discovery engine, which may use the corresponding multi-resolution schema and the passed elements of the image tag to construct a candidate address for retrieving one or more related images having different resolutions than the image found during act 306 (act 706). The one or more related images may be images of a higher resolution than the found image.

As an example, a multi-resolution scheme for a particular entry, such as, for example, an image called dsc7590.jpg, from an address, photos.com, may indicate that a corresponding thumbnail image may be retrieved from an address "photos.com/thumbnail/dsc7590.jpg", a corresponding medium resolution image may be retrieved from an address "photos.com/medium/dsc7590.jpg", and a corresponding high resolution image may be retrieved from "photos.com/high/dsc7590.jpg".

The multi-resolution schema may then be accessed to obtain a confidence level regarding an existence of the constructed candidate address (act 708). If the corresponding multi-resolution schema indicates that there is a high confidence level that the candidate address exists and will produce a corresponding different resolution image, processing device 104 may set a target image to be a result of retrieving content at the candidate address (act 712). Processing device 104 may then indicate that a related image was found (act 714) by, for example, setting a flag.

If, during act 708, the multi-resolution schema does not indicate a high level of confidence that the constructed candidate address exists, then processing device 104 may determine existence of the candidate address (act 710). This may be performed in a number of different ways. For example, the candidate address may be pinged by processing device 104 via network 102 to determine existence of the candidate address. If processing device 104 receives a response, as a result of pinging the candidate address, then the candidate address is determined to exist. In an alternate method of determining existence of the candidate address, content may be retrieved by processing device 104 using the candidate address. The image found during act 306 may then be compared with the content retrieved using the candidate address to determine whether the content is an image corresponding to the found image, and has a different resolution, such as, for example, a higher resolution.

If, as a result of performing act 710, the candidate address is determined to exist, (either via pinging the candidate address, determining that an image corresponding to the found image, but with a different resolution, exists at the candidate address, or via another method) then act 712 and 714 may be performed, as previously described. Otherwise, processing device 104 may determine whether other resolution images related to the found image exists, as indicated by the multi-resolution schema (act 716). If no other resolution images exist, then the process may be complete. Otherwise, act 706 may again be performed to construct a new candidate address based on one or more existing other resolution images, as indicated by the multi-resolution schema.

Figure 8:
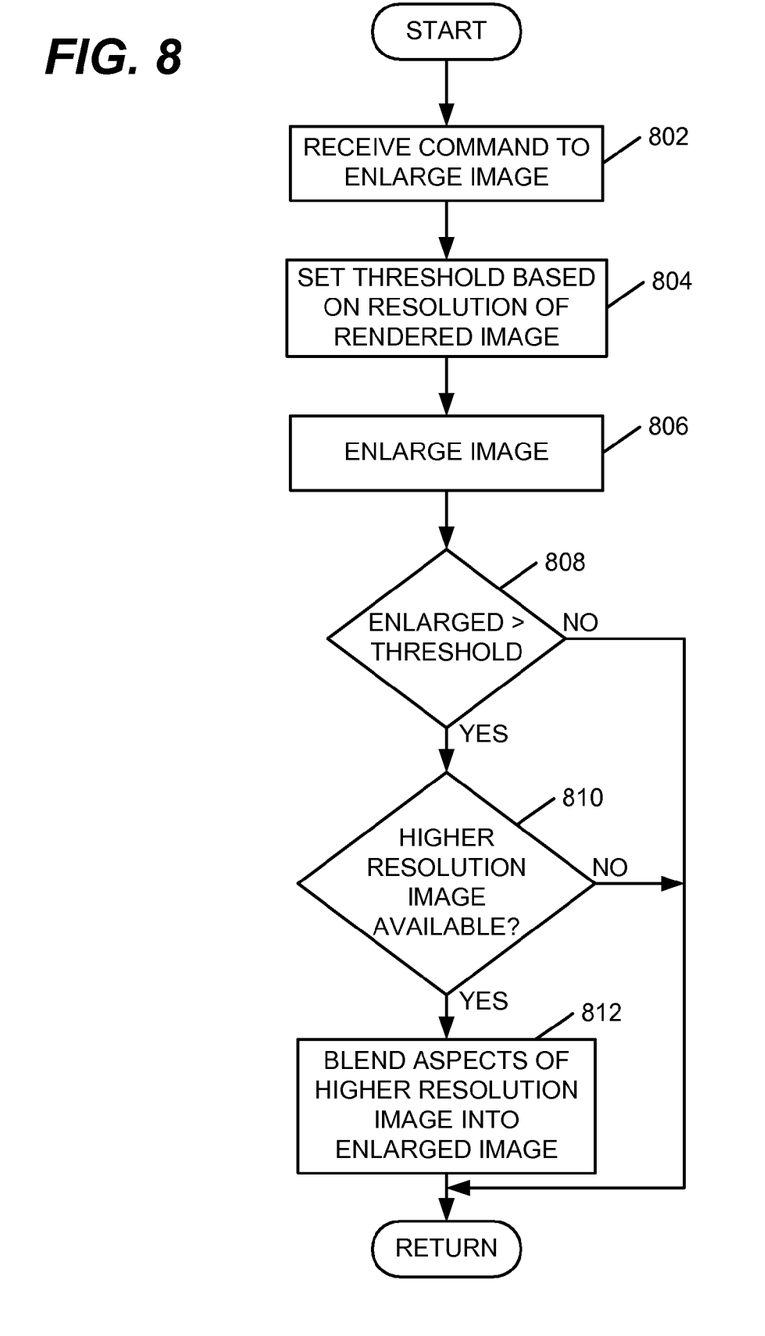
FIG. 8 is a flowchart illustrating an exemplary process for enlarging a rendered multi-resolution image.

FIG. 8 is a flowchart of an exemplary process for enlarging a rendered image included in rendered content. The process may begin with processing device 104 receiving a command from a user to enlarge or zoom-in on the rendered image (act 802). The user may provide the command via a number of different methods, including, but not limited to, using a pointing device, such as a computer mouse with a scroll wheel, to place a cursor over the rendered image. The user may roll the scroll wheel in a particular direction to indicate an amount by which the rendered image is to be enlarged. The user may roll the scroll wheel in an opposite direction to indicate an amount by which the rendered image is to be decreased in size. Of course, in other embodiments, many other methods may be used to indicate an amount by which a rendered image is to be enlarged or decreased in size.

Next, processing device 104 may set a threshold, with respect to an amount a rendered image may be enlarged without pixelation, based on a resolution of the rendered image (act 804). Processing device 104 may then enlarge the rendered image by the indicated amount (act 806). Processing device 104 may then determine whether the rendered image is enlarged beyond the threshold (act 808). If the rendered image is not enlarged beyond the threshold, then the process may be complete.

If, during act 808, processing device 104 determines that the rendered image is enlarged beyond the threshold, then processing device 104 may determine whether a corresponding higher resolution image is available (act 810). Processing device 104 may determine availability of a higher resolution image by determining whether a higher resolution image is linked to the rendered image, as may have been performed during act 402 (FIG. 4). If processing device 104 determines that a corresponding higher resolution image is available, then processing device 104 may blend aspects of the higher resolution image into the enlarged rendered image (act 812).

The process illustrated by the flowchart of FIG. 8 may be a recursive process. For example, after finding a higher resolution image and blending aspects of the high-resolution image into an enlarged rendered image, as performed by acts 810 and 812, another command to enlarge or zoom-in on the rendered image may be received (act 802) and a new threshold may be set according to a resolution of a current rendered image (act 804), which in this case is the blended enlarged rendered image. If processing device 104 enlarges the rendered image (act 806) and determines that the enlarged rendered image exceeds the threshold determined for the higher resolution image previously found during act 810 (act 808), then processing device 104 may determine whether a higher resolution image, which has a higher resolution than the previously used higher resolution image, is available (act 810). If such an image is available, then processing device 104 may blend aspects of the higher resolution image having a higher resolution than the previously used higher resolution image (act 812).

The process of FIG. 8 may continue to enlarge a rendered image without pixelation as long as a higher resolution image is determined to be available such that a threshold corresponding to the available higher resolution image is not exceeded by enlarging the rendered image.

Conclusion

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they are not be construed as limiting the claims in any way. Other configurations of the described embodiments are part of the scope of this disclosure. Further, implementations consistent with the subject matter of this disclosure may have more or fewer acts than as described, or may implement acts in a different order than as shown. Accordingly, the appended claims and their legal equivalents define the invention, rather than any specific examples given.

We claim as our invention:

1. A machine-implemented method for discovering and constructing a multi-resolution image, the machine-implemented method comprising:
    downloading content from a specified address via a network; finding a first image within the downloaded content;
    determining whether the specified address has an associated multi-resolution image schema;
    discovering a second image based on information associated with the first image, the second image being a higher resolution image corresponding to the first image, the discovering comprising:
        performing only when the specified address has the associated multi-resolution image schema:
            constructing, based on the associated multi-resolution image schema, a candidate address for a higher resolution image corresponding to the first image,
            determining whether the candidate address exists,
            fetching second content corresponding to the candidate address, and
            comparing the second content with the first image to determine whether the second content and the first image are of a same image, but with different resolution; and
    linking the first image and the second image together to create the multi-resolution image, wherein the linking further comprises:
        linking the first image with the second content when the comparing determines that the second content and the first image are of the same image.

2. The machine-implemented method of claim 1, further comprising:
    rendering the downloaded content including the first image;
    zooming-in on the first image included in the rendered content; and
    blending aspects of the second image into the zoomed-in first image to create an enlarged image.

3. The machine-implemented method of claim 1, wherein:
    the finding of a first image within the downloaded content further comprises:
        searching a document object model of the content to search for the first image embedded in an anchor tag;
    the discovering of a second image based on information associated with the first image further comprises:
        downloading a target of the anchor tag,
        determining whether the target of the anchor tag is an image,
        setting a target image to be the image when the target of the anchor tag is determined to be the image, and
        setting the target image to be an image representation of a rendering of the target of the anchor tag when the target of the anchor tag is determined not to be the image.

4. The machine-implemented method of claim 1, wherein:
    the discovering a second image based on information associated with the first image further comprises:
        considering the candidate address as an address for the second image only when the specified address has the associated multi-resolution image schema.

5. The machine-implemented method of claim 1, further comprising:
    providing a visual indication when a higher resolution image corresponding to a rendered image is found.

6. The machine-implemented method of claim 1, further comprising:
    discovering a third image based on information associated with the first image, the third image corresponding to the first image and having a different resolution than a resolution of the first image and a resolution of the second image;
    linking the third image with the first image and the second image to create the multi-resolution image;
    rendering the downloaded content including the first image;
    zooming-in on the first image included in the rendered content;
    blending aspects of the second image into the zoomed-in first image to create an enlarged image when the zoomed-in first image exceeds a first threshold;
    zooming-in on the enlarged image; and
    blending aspects of the third image into the zoomed-in enlarged image to create a second enlarged image larger than the enlarged image when the zoomed-in enlarged image exceeds a second threshold.

7. A machine-readable storage device having instructions recorded thereon for at least one processor, the instructions comprising:
    instructions for finding a first image within downloaded content from a specified address via a network;

instructions for determining whether the specified address has an associated multi-resolution image schema;
instructions for attempting to discover a second image, based on information associated with the first image, the second image having a resolution different from a resolution of the first image, the attempting to discover a second image further including:
instructions for performing only when the specified address has the associated multi-resolution image schema:
constructing, based on the associated multi-resolution image schema, a candidate address for a higher resolution image corresponding to the first image,
determining whether the candidate address exists,
fetching second content corresponding to the candidate address, and
comparing the second content with the first image to determine whether the second content and the first image are of a same image, but with different resolution; and
instructions for linking the first image and the second image to create a multi-resolution image, wherein the instructions for linking further comprise:
instructions for linking the first image with the second content when the comparing determines that the second content and the first image are of the same image.

8. The machine-readable storage device of claim 7, wherein: the constructing a candidate address for a higher resolution image corresponding to the first image constructs the candidate address based on elements of an image tag described in the associated multi-resolution image schema.

9. The machine-readable storage device of claim 7, wherein the instructions further comprise:
instructions for rendering the downloaded content including the first image,
instructions for receiving a command to enlarge the first image to produce an enlarged image,
instructions for determining that the first image is enlarged beyond a threshold, and
instructions for blending aspects of the second image into the enlarged image when the first image is determined to be enlarged beyond the threshold.

10. The machine-readable storage device of claim 7, wherein the instructions further comprise:
instructions for attempting to discover a third image, related to the first image, based on information associated with the downloaded content, the third image having a resolution different from a resolution of the first image and a resolution of the second image; and
instructions for linking the third image with the first image.

11. The machine-readable storage device of claim 7, wherein the instructions further comprise:
instructions for attempting to discover a third image, based on information associated with the first image, the third image having a resolution different from a resolution of the first image and a resolution of the second image;
instructions for linking the third image with the first image and the second image;
instructions for rendering the downloaded content including the first image;
instructions for receiving a command to enlarge the first image to produce an enlarged first image;
instructions for determining that the enlarged first image is enlarged beyond a first threshold;
instructions for blending aspects of the second image into the enlarged first image when the enlarged first image is determined to be enlarged beyond the first threshold;
instructions for determining that the enlarged first image is enlarged beyond a second threshold; and
instructions for blending aspects of the third image into the enlarged first image when the enlarged first image is determined to be enlarged beyond the second threshold.

12. The machine-readable storage device of claim 7, wherein the instructions for determining whether the candidate address exists further comprise:
instructions for pinging the candidate address, receiving of a response to the pinging indicating that the candidate address exists.

13. A processing device comprising:
at least one processor; and
a memory having instructions stored therein for the at least one processor, the instructions comprising:
instructions for downloading content from a specified address via a network;
instructions for finding a first image within the downloaded content; instructions for discovering a second image based on information associated with the first image, the second image being a higher resolution image corresponding to the first image;
instructions for linking the first image and the second image together to create a multi-resolution image;
instructions for discovering a third image based on information associated with the first image, the third image corresponding to the first image and having a different resolution than a resolution of the first image and a resolution of the second image;
instructions for linking the third image with the first image and the second image to create the multi-resolution image;
instructions for rendering the downloaded content including the first image;
instructions for zooming-in on the first image included in the rendered content;
instructions for blending aspects of the second image into the zoomed-in first image to create an enlarged image when the zoomed-in first image exceeds a first threshold;
instructions for zooming-in on the enlarged image; and
instructions for blending aspects of the third image into the zoomed-in enlarged image to create a second enlarged image larger than the enlarged image when the zoomed-in enlarged image exceeds a second threshold.

14. The processing device of claim 13, wherein:
the instructions for finding a first image within the downloaded content further comprise:
instructions for searching a document object model of the downloaded content for the first image embedded in an anchor tag.

15. The processing device of claim 14, wherein:
the instructions for discovering a second image based on information associated with the first image further comprise:
instructions for downloading a target of the anchor tag,
instructions for determining whether the target of the anchor tag is an image,
instructions for setting a target image to be the image when the target of the anchor tag is determined to be the image,
instructions for comparing the first image with the target image to determine whether the target image and the first image are of a same image, but with different resolution; and the instructions for linking the first image and the second image together to create a multi-resolution image further comprise:

instructions for linking the first image and the target image together to create the multi-resolution image when the first image and the target image are determined to be of the same image.

16. The machine-readable storage device of claim 7, wherein the instructions for finding a first image within the downloaded content further comprise:

instructions for searching a document object model of the content for the first image embedded in an anchor tag; and the instructions for attempting to discover a second image, based on information associated with the first image, further comprise:

instructions for downloading a target of the anchor tag, instructions for determining whether the target of the anchor tag is an image, and instructions for setting a target image to be an image representation of a rendering of the target of the anchor tag when the target of the anchor tag is determined not to be the image.

17. The machine-readable storage device of claim 7, wherein the instructions further comprise:

instructions for providing a visual indication when at least one other image is linked to the first image, the at least one other image corresponding to the first image and having a different resolution than a resolution of the first image.

18. The processing device of claim 13, wherein the instructions further comprise:

instructions for providing a visual indication when at least one image from a group consisting of the second image and the third image is linked to the first image.

* * * * *